US011159268B2

(12) United States Patent
Chen

(10) Patent No.: US 11,159,268 B2
(45) Date of Patent: Oct. 26, 2021

(54) WAVEFORM SELECTION METHOD AND DEVICE

(71) Applicant: HUAWEI TECHNOLOGIES CO., LTD., Guangdong (CN)

(72) Inventor: Baojun Chen, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/852,080

(22) Filed: Apr. 17, 2020

(65) Prior Publication Data
US 2020/0244389 A1 Jul. 30, 2020

Related U.S. Application Data

(63) Continuation of application No. PCT/CN2017/107323, filed on Oct. 23, 2017.

(51) Int. Cl.
H04W 4/00 (2018.01)
H04L 1/00 (2006.01)
(Continued)

(52) U.S. Cl.
CPC .......... *H04L 1/0003* (2013.01); *H04L 1/0009* (2013.01); *H04L 1/0026* (2013.01);
(Continued)

(58) Field of Classification Search
CPC ... H04L 1/0003; H04L 1/0009; H04L 1/0026; H04L 5/0007; H04L 27/2628; H04L 27/2636; H04W 52/241
(Continued)

(56) References Cited

U.S. PATENT DOCUMENTS

2015/0087352 A1 3/2015 Lim et al.
2020/0127786 A1* 4/2020 Kwak ................... H04L 5/0026
(Continued)

FOREIGN PATENT DOCUMENTS

CN 104125184 A 10/2014
CN 106992846 A 7/2017
(Continued)

OTHER PUBLICATIONS

Office Action issued in Chinese Application No. 201780095756.0 dated Nov. 3, 2020, 10 pages (with English translation).
(Continued)

Primary Examiner — Tesfaldet Bocure
(74) Attorney, Agent, or Firm — Fish & Richardson P.C.

(57) ABSTRACT

A waveform selection method and a device are disclosed. The method includes: obtaining an uplink signal sent by a terminal device; measuring, based on the obtained uplink signal N corresponding signal-to-noise ratios when the terminal device sends the uplink signal by using N ranks; calculating a first modulation and coding efficiency corresponding to each of the first signal-to-noise ratios; calculating, based on the first modulation and coding efficiency corresponding to each first signal-to-noise ratio, a second modulation and coding efficiency corresponding to each rank; selecting a target modulation and coding efficiency from second modulation and coding efficiencies corresponding to the N ranks; determining a target modulation and coding scheme; determining a target modulation scheme based on a target rank and the target modulation and coding scheme; and determining, based on the target modulation scheme and the target rank, a waveform type for the terminal device.

20 Claims, 3 Drawing Sheets

(51) Int. Cl.
   *H04L 5/00*      (2006.01)
   *H04L 27/26*     (2006.01)
   *H04W 52/24*     (2009.01)

(52) U.S. Cl.
   CPC ........ *H04L 5/0007* (2013.01); *H04L 27/2628* (2013.01); *H04L 27/2636* (2013.01); *H04W 52/241* (2013.01)

(58) Field of Classification Search
   USPC .......................................... 370/329; 375/377
   See application file for complete search history.

(56) References Cited

U.S. PATENT DOCUMENTS

2020/0274585 A1* 8/2020 Huang .............. H04L 25/03898
   2021/0021994 A1* 1/2021 Kolekar ................ H04L 9/3242

FOREIGN PATENT DOCUMENTS

EP           3531591 A1      8/2019
   WO   WO-2019079936 A1 *    5/2019  ......... H04L 27/0008

OTHER PUBLICATIONS

Nokia et al.,"UL-MIMO diversity-based transmission",3GPP TSG-RAN WG1 Meeting #90, R1-1714237, Prague, Czech Republic, Aug. 21-25, 2017, 3 pages.

Qualcomm et al.,"WF on Waveform for NR Uplink",3GPP TSG RAN WG1 Meeting #86-Bis, R1-1610485, Lisbon, Portugal, Oct. 10-14, 2016, 6 pages.

Ericsson,"On MCS/transport Block Size Determination for PUSCH",3GPP TSG-HAN WG1 Meeting #89, R1-1709096, Hangzhou, China, May 15-19, 2017, 6 pages.

ZTE et al.,"Discussion on uplink DMRS design",3GPP TSG RAN WG1 Meeting #88bis, R1-1704412,Spokane, USA, Apr. 3-7, 2017, 9 pages.

Ericsson,"On DL/UL Resource Allocation",3GPP TSG RAN1 WG1 Meeting NR#3, R1-1716594, Nagoya, Japan, Sep. 18-21, 2017, 14 pages.

Extended European Search Report issued in European Application No. 17929738.7 dated Sep. 1, 2020, 10 pages.

PCT International Search Report and Written Opinion in International Application No. PCT/CN2017/107,323, dated Jul. 18, 2018, 13 pages (With English Translation).

* cited by examiner

WAVEFORM SELECTION METHOD AND DEVICE

CROSS-REFERENCE TO RELATED APPLICATIONS

This application is a continuation of International Application No. PCT/CN2017/107323, filed on Oct. 23, 2017, the disclosure of which is hereby incorporated by reference in its entirety.

TECHNICAL FIELD

This application relates to the field of wireless communications technologies, and in particular, to a waveform selection method and a device.

BACKGROUND

In a fifth generation communications system, an uplink physical shared channel supports two waveforms: a cyclic prefix orthogonal frequency division multiplexing (CP-OFDM) waveform and a discrete Fourier transform-spread orthogonal frequency division multiplexing (DFT-S-OFDM) waveform. The CP-OFDM may be used for single-stream transmission or multi-stream transmission. The DFT-S-OFDM is used only for single-stream transmission. To improve a throughput of a wireless communications system, the wireless communications system currently supports two waveforms: the CP-OFDM waveform and the DFT-S-OFDM waveform. A base station may select a CP-OFDM waveform or a DFT-S-OFDM waveform for a terminal device, and interact with the terminal device by using the selected waveform. Waveforms on which the CP-OFDM waveform and the DFT-S-OFDM waveform are based are necessary waveforms for communication of the terminal device.

Therefore, when a wireless communications system supports both the CP-OFDM waveform and the DFT-S-OFDM waveform, the base station needs to select a proper waveform for the terminal device for communication, to improve performance of the wireless communications system.

SUMMARY

This application provides a waveform selection method and a device, to resolve a prior-art problem of how to select a proper waveform for a terminal device.

A first aspect of this application provides a waveform selection method. The method is applied to a network side device, and the method mainly includes:

obtaining an uplink signal sent by a terminal device;

measuring, based on the uplink signal, N corresponding first signal-to-noise ratios when the terminal device sends the uplink signal by using N RANKs, where N is a positive integer;

calculating a first modulation and coding efficiency corresponding to each first signal-to-noise ratio;

calculating, based on the first modulation and coding efficiency corresponding to each first signal-to-noise ratio, a second modulation and coding efficiency corresponding to each RANK;

selecting a target modulation and coding efficiency from second modulation and coding efficiencies corresponding to the N RANKs;

determining a target modulation and coding scheme based on the target modulation and coding efficiency and a historical waveform that is selected by the terminal device;

determining a target modulation scheme based on a target RANK and the target modulation and coding scheme; and determining, based on the target modulation scheme and the target RANK, a waveform type currently selected for the terminal device, where the waveform type includes cyclic prefix orthogonal frequency division multiplexing CP-OFDM or discrete Fourier transform spread orthogonal frequency division multiplexing DFT-S-OFDM.

Compared with an existing mechanism, in this application, the network side device measures, based on the uplink signal, the N corresponding first signal-to-noise ratios when the terminal device sends the uplink signal by using the N RANKs; calculates the first modulation and coding efficiency corresponding to each first signal-to-noise ratio; calculates, based on the first modulation and coding efficiency corresponding to each first signal-to-noise ratio, the second modulation and coding efficiency corresponding to each RANK; selects the target modulation and coding efficiency from the second modulation and coding efficiencies corresponding to the N RANKs; determines the target modulation and coding scheme based on the target modulation and coding efficiency and the historical waveform that is selected by the terminal device; and determines the target modulation scheme based on the target RANK and the target modulation and coding scheme. It can be learned that the network side device can select a proper waveform for the terminal device by using this solution. Compared with a scenario in which CP-OFDM is fixedly used, this application can increase a signal-to-noise ratio of sending and receiving a signal on a terminal device side, thereby improving an uplink throughput of the terminal device.

In some implementations, a modulation scheme corresponding to a target modulation format may include binary phase shift keying BPSK, quadrature phase shift keying QPSK, 16QAM, 64QAM, 256QAM, and the like.

In some implementations, a waveform selection rule may further be preset, to improve waveform selection efficiency.

In some implementations, the calculating a first modulation and coding efficiency corresponding to each first signal-to-noise ratio includes one of the following implementations:

if the historical waveform is CP-OFDM, determining a target signal-to-noise ratio in the N first signal-to-noise ratios based on a first mapping relationship, and using a modulation and coding efficiency corresponding to the target signal-to-noise ratio as the first modulation and coding efficiency; or if the historical waveform is DFT-S-OFDM, determining a target signal-to-noise ratio in the N first signal-to-noise ratios based on a second mapping relationship, and using a modulation and coding efficiency corresponding to the target signal-to-noise ratio as the first modulation and coding efficiency.

It can be learned that based on the preset first mapping relationship and the preset second mapping relationship, the network side device can quickly determine a proper target signal-to-noise ratio, and further determine the first modulation and coding efficiency, thereby reducing operation load.

In some implementations, the first mapping relationship includes a mapping relationship between a modulation and coding scheme, a modulation scheme, a signal-to-noise ratio, and a modulation and coding efficiency; and the determining a target signal-to-noise ratio in the N first signal-to-noise ratios based on a first mapping relationship includes:

selecting a first candidate signal-to-noise ratio from the N first signal-to-noise ratios;

traversing signal-to-noise ratios in the first mapping relationship; and when a signal-to-noise ratio less than or equal to the first candidate signal-to-noise ratio is found through traverse, determining the signal-to-noise ratio less than or equal to the first candidate signal-to-noise ratio as the target signal-to-noise ratio.

In some implementations, the second mapping relationship includes a mapping relationship between a modulation and coding scheme, a modulation scheme, a signal-to-noise ratio, and a modulation and coding efficiency; and the determining a target signal-to-noise ratio in the N first signal-to-noise ratios based on a second mapping relationship includes:

selecting a second candidate signal-to-noise ratio from the N first signal-to-noise ratios;

traversing signal-to-noise ratios in the second mapping relationship; and when a signal-to-noise ratio less than or equal to the second candidate signal-to-noise ratio is found through traverse, determining the signal-to-noise ratio less than or equal to the second candidate signal-to-noise ratio as the target signal-to-noise ratio.

In some implementations, the determining a target modulation and coding scheme based on the target modulation and coding efficiency and a historical waveform that is selected by the terminal device includes:

determining a target RANK corresponding to the target modulation and coding efficiency;

calculating a second signal-to-noise ratio corresponding to the target RANK; and determining the target modulation and coding scheme based on the second signal-to-noise ratio and the historical waveform that is selected by the terminal device.

In some implementations, if the historical waveform is CP-OFDM, the determining the target modulation and coding scheme based on the second signal-to-noise ratio and the historical waveform that is selected by the terminal device includes:

traversing the signal-to-noise ratios in the first mapping relationship; and when a signal-to-noise ratio less than or equal to the second signal-to-noise ratio is found through traverse, using a modulation and coding scheme corresponding to the signal-to-noise ratio less than or equal to the second signal-to-noise ratio as the target modulation and coding scheme; or if the historical waveform is DFT-S-OFDM, traversing the signal-to-noise ratios in the second mapping relationship; and when a signal-to-noise ratio less than or equal to the second signal-to-noise ratio is found through traverse, using a modulation and coding scheme corresponding to the signal-to-noise ratio less than or equal to the second signal-to-noise ratio as the target modulation and coding scheme.

In some implementations, if the historical waveform is not CP-OFDM, or the historical waveform is DFT-S-OFDM, a manner for selecting a target modulation scheme may be determined based on a value of the target RANK. Specifically, the selecting a target modulation and coding scheme based on the target modulation and coding efficiency and a historical waveform that is selected by the terminal device may include the following three scenarios:

(1) When the target RANK=1, and a difference between the second signal-to-noise ratio and a power back-off gain is greater than a signal-to-noise ratio threshold, the signal-to-noise ratios in the first mapping relationship are traversed; and if a candidate signal-to-noise ratio less than or equal to the difference between the second signal-to-noise ratio and the power back-off gain is found through traverse, a modulation and coding scheme corresponding to the candidate signal-to-noise ratio is used as the target modulation and coding scheme. The signal-to-noise ratio threshold is a signal-to-noise ratio corresponding to a modulation and coding scheme whose modulation scheme is 16QAM and whose bit rate is the lowest.

(2) When the target RANK=1, and a difference between the second signal-to-noise ratio and a power back-off gain is less than or equal to a signal-to-noise ratio threshold, the signal-to-noise ratios in the second mapping relationship are traversed, and if a candidate signal-to-noise ratio less than or equal to a difference between the first signal-to-noise ratio and the power back-off gain is found through traverse, a modulation and coding scheme corresponding to the candidate signal-to-noise ratio is used as the target modulation and coding scheme.

(3) When the target RANK>1, the signal-to-noise ratios in the first mapping relationship are traversed; and if a candidate signal-to-noise ratio less than or equal to a difference between the second signal-to-noise ratio and a power back-off gain is found through traverse, the candidate signal-to-noise ratio is used as the target modulation and coding scheme.

It can be learned that based on the preset first mapping relationship and the preset second mapping relationship, the network side device can quickly determine a proper target modulation and coding scheme, thereby improving waveform selection efficiency and reducing operation load.

Another aspect of this application provides a network side device. The network side device has functions of implementing behavior of the network side device in the foregoing method design. The functions may be implemented by hardware, or may be implemented by hardware executing corresponding software. The hardware or the software includes one or more modules corresponding to the foregoing functions. The module may be software and/or hardware.

The network side device includes:

a transceiver module, configured to obtain an uplink signal sent by a terminal device;

a measurement module, configured to measure, based on the uplink signal obtained by the transceiver module, N corresponding first signal-to-noise ratios when the terminal device sends the uplink signal by using N RANKs, where N is a positive integer; and a processing module, configured to: calculate a first modulation and coding efficiency corresponding to each first signal-to-noise ratio;

calculate, based on the first modulation and coding efficiency corresponding to each first signal-to-noise ratio, a second modulation and coding efficiency corresponding to each RANK;

select a target modulation and coding efficiency from second modulation and coding efficiencies corresponding to the N RANKs;

determine a target modulation and coding scheme based on the target modulation and coding efficiency and a historical waveform that is selected by the terminal device;

determine a target modulation scheme based on a target RANK and the target modulation and coding scheme; and determine, based on the target modulation scheme and the target RANK, a waveform type currently selected for the terminal device, where the waveform type includes cyclic prefix orthogonal frequency division multiplexing CP-OFDM or discrete Fourier transform spread orthogonal frequency division multiplexing DFT-S-OFDM.

In some implementations, the processing module is specifically configured to perform one of the following operations:

if the historical waveform is CP-OFDM, determining a target signal-to-noise ratio in the N first signal-to-noise ratios based on a first mapping relationship, and using a modulation and coding efficiency corresponding to the target signal-to-noise ratio as the first modulation and coding efficiency; or if the historical waveform is DFT-S-OFDM, determining a target signal-to-noise ratio in the N first signal-to-noise ratios based on a second mapping relationship, and using a modulation and coding efficiency corresponding to the target signal-to-noise ratio as the first modulation and coding efficiency.

In some implementations, the first mapping relationship includes a mapping relationship between a modulation and coding scheme, a modulation scheme, a signal-to-noise ratio, and a modulation and coding efficiency; and the processing module is specifically configured to:

select a first candidate signal-to-noise ratio from the N first signal-to-noise ratios;

traverse signal-to-noise ratios in the first mapping relationship; and when a signal-to-noise ratio less than or equal to the first candidate signal-to-noise ratio is found through traverse, determine the signal-to-noise ratio less than or equal to the first candidate signal-to-noise ratio as the target signal-to-noise ratio.

In some implementations, the second mapping relationship includes a mapping relationship between a modulation and coding scheme, a modulation scheme, a signal-to-noise ratio, and a modulation and coding efficiency; and the processing module is specifically configured to:

select a second candidate signal-to-noise ratio from the N first signal-to-noise ratios;

traverse signal-to-noise ratios in the second mapping relationship; and when a signal-to-noise ratio less than or equal to the second candidate signal-to-noise ratio is found through traverse, determine the signal-to-noise ratio less than or equal to the second candidate signal-to-noise ratio as the target signal-to-noise ratio.

In some implementations, the processing module is specifically configured to:

determine a target RANK corresponding to the target modulation and coding efficiency;

calculate a second signal-to-noise ratio corresponding to the target RANK; and determine the target modulation and coding scheme based on the second signal-to-noise ratio and the historical waveform that is selected by the terminal device.

In some implementations, if the historical waveform is CP-OFDM, the processing module is specifically configured to:

traverse the signal-to-noise ratios in the first mapping relationship; and when a signal-to-noise ratio less than or equal to the second signal-to-noise ratio is found through traverse, use a modulation and coding scheme corresponding to the signal-to-noise ratio less than or equal to the second signal-to-noise ratio as the target modulation and coding scheme.

In some implementations, if the historical waveform is not CP-OFDM, or the historical waveform is DFT-S-OFDM, the processing module is specifically configured to:

when the target RANK=1, and a difference between the second signal-to-noise ratio and a power back-off gain is greater than a signal-to-noise ratio threshold, traverse the signal-to-noise ratios in the first mapping relationship; and if a candidate signal-to-noise ratio less than or equal to the difference between the second signal-to-noise ratio and the power back-off gain is found through traverse, use a modulation and coding scheme corresponding to the candidate signal-to-noise ratio as the target modulation and coding scheme; or when the target RANK=1, and a difference between the second signal-to-noise ratio and a power back-off gain is less than or equal to a signal-to-noise ratio threshold, traverse the signal-to-noise ratios in the second mapping relationship; and if a candidate signal-to-noise ratio less than or equal to a difference between the first signal-to-noise ratio and the power back-off gain is found through traverse, use a modulation and coding scheme corresponding to the candidate signal-to-noise ratio as the target modulation and coding scheme; or when the target RANK>1, traverse the signal-to-noise ratios in the first mapping relationship; and if a candidate signal-to-noise ratio less than or equal to a difference between the second signal-to-noise ratio and a power back-off gain is found through traverse, use a modulation and coding scheme corresponding to the candidate signal-to-noise ratio as the target modulation and coding scheme.

Another aspect of this application provides a network side device. The network side device includes at least one connected processor, a memory, a transmitter, and a receiver. The memory is configured to store program code, and the processor is configured to invoke the program code in the memory to perform the method according to the foregoing aspect.

Another aspect of this application provides a computer-readable storage medium. The computer-readable storage medium stores an instruction. When the instruction is run on a computer, the computer is enabled to perform the method according to the foregoing aspect.

Another aspect of this application provides a computer program product including an instruction. When the computer program product is run on a computer, the computer is enabled to perform the method according to the foregoing aspect.

DESCRIPTION OF EMBODIMENTS

Figure 1:
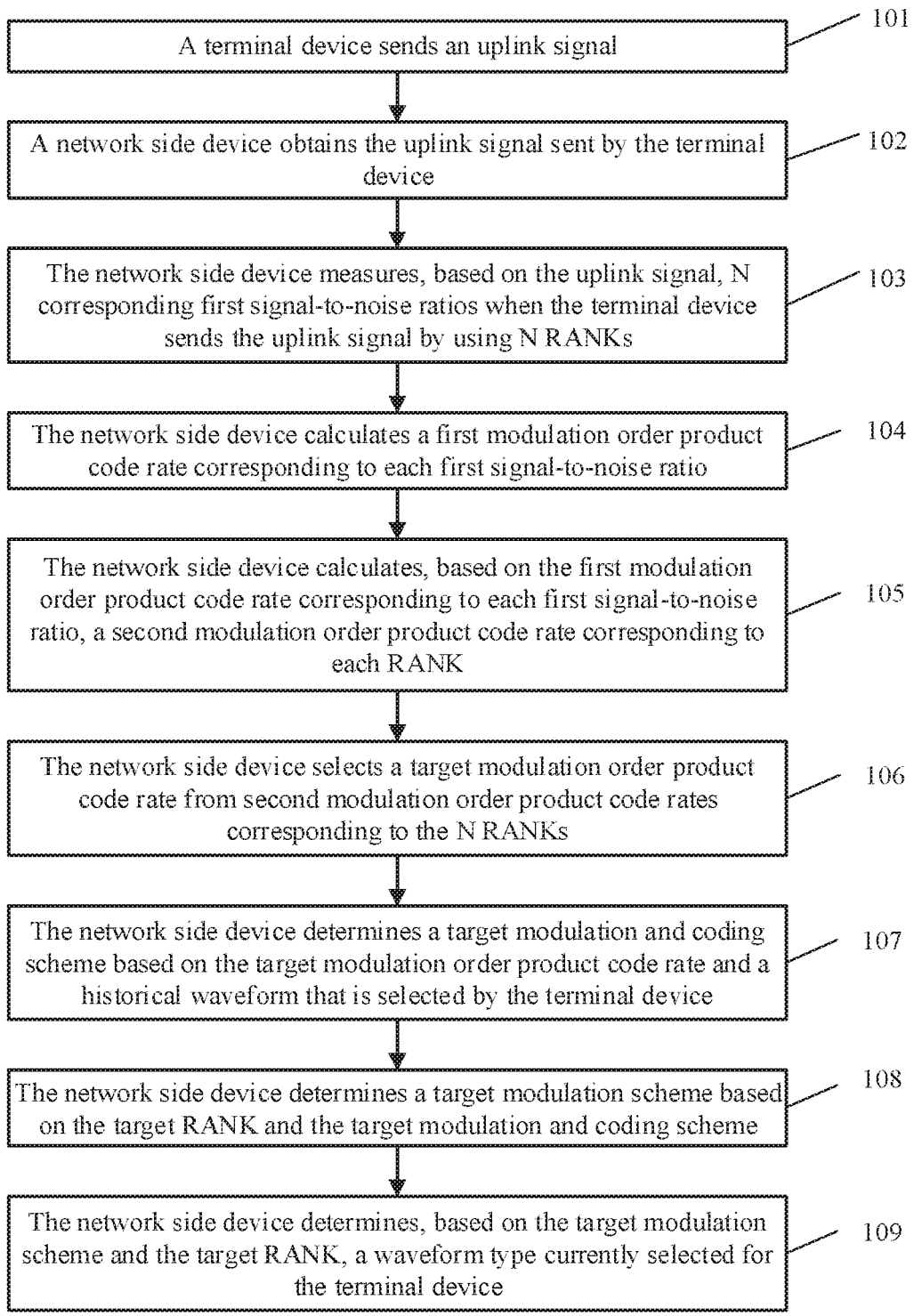
FIG. 1 is a flowchart of a waveform selection method according to an embodiment of this application.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this application is merely logical division, and there may be another division during implementation in actual application. For example, multiple modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this application. In addition, modules or sub-modules described as separate components may be or may not be physically separated, or may be or may not be physical modules, or may not be grouped into multiple circuit modules. Objectives of the solutions of the embodiments of this application may be achieved by selecting some or all of the modules according to actual requirements.

The embodiments of this application provide a waveform selection method and a device, applied to the communications field, to improve resource utilization of a communications system and properly allocate resources. This application may be applicable to a plurality of types of wireless communications systems, for example, a global system for mobile communications (GSM), a mobile telecommunications system (UMTS), a code division multiple access (CDMA) system, and a new network system. Specific embodiments are described by using an LTE system as an example below.

A network side device in this application is a device for connecting a terminal device to a wireless network, and includes, but is not limited to, an evolved NodeB (eNB), a radio network controller (RNC), a NodeB (NB), a base station controller (BSC), a base transceiver station (BTS), a home base station (for example, a Home evolved NodeB or a Home Node B, HNB), and a baseband unit (BBU).

Particularly, it should be particularly noted that a terminal device in the embodiments of this application may be a device providing a user with voice and/or data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be called a system, a subscriber unit, a subscriber station, a mobile station, a mobile console, a remote station, an access point, a remote terminal, an access terminal, a user terminal, a terminal device, a user agent, a user device, or user equipment.

Referring to FIG. 1, the following describes a waveform selection method in an embodiment of this application. This embodiment of this application includes the following steps.

101. A terminal device transmits an uplink signal.

During the transmission, the terminal device may use different RANKs. When the different ranks are used, signal-to-noise ratios of uplink signals transmitted by the terminal device are different.

102. A network side device obtains the uplink signal sent by the terminal device.

103. The network side device measures, based on the uplink signal, N corresponding first signal-to-noise ratios when the terminal device sends the uplink signal by using N RANKs.

N is a positive integer. The network side device may distinguish between signal-to-noise ratios (SINR) based on different RANKs used by the terminal device to send the uplink signal, and the signal-to-noise ratios may be denoted as SINR[iRank][iLayer], where iRank=1, 2, . . . , or MaxRank; iLayer=0, 1, . . . , or iRank−1; and MaxRank indicates a maximum RANK that can be used by the terminal device.

104. The network side device calculates a first modulation and coding efficiency corresponding to each first signal-to-noise ratio.

In some embodiments of this application, different mapping relationships may further be preset based on waveform types, to quickly calculate a proper modulation and coding efficiency and select a proper modulation and coding scheme. Specifically, the calculating a first modulation and coding efficiency corresponding to each first signal-to-noise ratio includes one of the following implementations:

(1) If the historical waveform is CP-OFDM, a target signal-to-noise ratio is determined in the N first signal-to-noise ratios based on a first mapping relationship, and a modulation and coding efficiency corresponding to the target signal-to-noise ratio is used as the first modulation and coding efficiency. In some implementations, the first mapping relationship includes a mapping relationship between a modulation and coding scheme, a modulation scheme, a signal-to-noise ratio, and a modulation and coding efficiency. For example, Table 1 is an example of the first mapping relationship.

In some implementations, the determining a target signal-to-noise ratio in the N first signal-to-noise ratios based on a first mapping relationship may include:

selecting a first candidate signal-to-noise ratio from the N first signal-to-noise ratios, and then traversing signal-to-noise ratios in the first mapping relationship; and when a signal-to-noise ratio less than or equal to the first candidate signal-to-noise ratio is found through traverse, determining the signal-to-noise ratio less than or equal to the first candidate signal-to-noise ratio as the target signal-to-noise ratio.

For example, in Table 1, MCS represents a modulation and coding scheme (MCS), and SINR represents a signal-to-noise ratio (SINR). For example, after the first candidate signal-to-noise ratio is selected, traversal comparison may be performed based on the first mapping relationship shown in Table 1. If it is obtained through comparison that an $SINR_0$ is less than or equal to the first candidate signal-to-noise ratio, the $SINR_0$ may be used as the target signal-to-noise ratio; and then, it may be found based on the first mapping relationship that a modulation and coding efficiency corresponding to the $SINR_0$ is $EFF_0$. Subsequent Table 2 is similar, and details are not described again.

(2) If the historical waveform is DFT-S-OFDM, a target signal-to-noise ratio is determined in the N first signal-to-noise ratios based on a second mapping relationship, and a modulation and coding efficiency corresponding to the target signal-to-noise ratio is used as the first modulation and coding efficiency. In some implementations, the second mapping relationship includes a mapping relationship between a modulation and coding scheme, a modulation scheme, a signal-to-noise ratio, and a modulation and coding efficiency. For example, Table 2 is an example of the second mapping relationship.

In some implementations, the determining a target signal-to-noise ratio in the N first signal-to-noise ratios based on a second mapping relationship may include:

selecting a second candidate signal-to-noise ratio from the N first signal-to-noise ratios, and then traversing signal-to-noise ratios in the second mapping relationship; and when a signal-to-noise ratio less than or equal to the second candidate signal-to-noise ratio is found through traverse, determining the signal-to-noise ratio less than or equal to the second candidate signal-to-noise ratio as the target signal-to-noise ratio.

TABLE 1

| MCS | Modulation scheme | SINR (dB) | Modulation and coding efficiency EFF (bit/s/Hz) |
|---|---|---|---|
| 0 | $Modulation_0$ | $SINR_0$ | $EFF_0$ |
| 1 | $Modulation_1$ | $SINR_1$ | $EFF_1$ |
| ... | ... | ... | ... |
| $MCS_{N-1}$ | $Modulation_{N-1}$ | $SINR_{N-1}$ | $EFF_{N-1}$ |

TABLE 2

| MCS | Modulation scheme | SINR (dB) | Modulation and coding efficiency EFF (bit/s/Hz) |
|---|---|---|---|
| 0 | $Modulation_0$ | $SINR_0$ | $EFF_0$ |
| 1 | $Modulation_1$ | $SINR_1$ | $EFF_1$ |
| ... | ... | ... | ... |
| $MCS_{M-1}$ | $Modulation_{M-1}$ | $SINR_{M-1}$ | $EFF_{M-1}$ |

It can be learned that based on the preset first mapping relationship and the preset second mapping relationship, the network side device can quickly determine a proper target signal-to-noise ratio, and further determine the first modulation and coding efficiency, thereby reducing operation load.

105. The network side device calculates, based on the first modulation and coding efficiency corresponding to each first signal-to-noise ratio, a second modulation and coding efficiency corresponding to each RANK.

106. The network side device selects a target modulation and coding efficiency from second modulation and coding efficiencies corresponding to the N RANKs.

In some implementations, the determining a target modulation and coding scheme based on the target modulation and coding efficiency and a historical waveform that is selected by the terminal device may be implemented through the following steps:

a. Determine a target RANK corresponding to the target modulation and coding efficiency.

b. Calculate a second signal-to-noise ratio corresponding to the target RANK.

c. Determine the target modulation and coding scheme based on the second signal-to-noise ratio and the historical waveform that is selected by the terminal device.

107. The network side device determines a target modulation and coding scheme based on the target modulation and coding efficiency and a historical waveform that is selected by the terminal device.

A manner of determining the target modulation scheme may be mainly classified into the following two types based on a type of the historical waveform:

In some implementations, if the historical waveform is CP-OFDM, the network side device may traverse the signal-to-noise ratios in the first mapping relationship; and when a signal-to-noise ratio less than or equal to the second signal-to-noise ratio is found through traverse, use a modulation and coding scheme corresponding to the signal-to-noise ratio less than or equal to the second signal-to-noise ratio as the target modulation and coding scheme.

In some implementations, if the historical waveform is not CP-OFDM, or the historical waveform is DFT-S-OFDM, a manner for selecting a target modulation scheme may be determined based on a value of the target RANK. Specifically, the selecting a target modulation and coding scheme based on the target modulation and coding efficiency and a historical waveform that is selected by the terminal device may include the following three scenarios:

(1) When the target RANK=1, and a difference between the second signal-to-noise ratio and a power back-off gain is greater than a signal-to-noise ratio threshold, the network side device may traverse the signal-to-noise ratios in the first mapping relationship; and if a candidate signal-to-noise ratio less than or equal to the difference between the second signal-to-noise ratio and the power back-off gain is found through traverse, use a modulation and coding scheme corresponding to the candidate signal-to-noise ratio as the target modulation and coding scheme. The signal-to-noise ratio threshold is a signal-to-noise ratio corresponding to a modulation and coding scheme whose modulation scheme is quadrature amplitude modulation (QAM) and whose bit rate is the lowest.

(2) When the target RANK=1, and a difference between the second signal-to-noise ratio and a power back-off gain is less than or equal to a signal-to-noise ratio threshold, the network side device may traverse the signal-to-noise ratios in the second mapping relationship; and if a candidate signal-to-noise ratio less than or equal to a difference between the first signal-to-noise ratio and the power back-off gain is found through traverse, use a modulation and coding scheme corresponding to the candidate signal-to-noise ratio as the target modulation and coding scheme.

(3) When the target RANK>1, the network side device may traverse the signal-to-noise ratios in the first mapping relationship; and if a candidate signal-to-noise ratio less than or equal to a difference between the second signal-to-noise ratio and a power back-off gain is found through traverse, use a modulation and coding scheme corresponding to the candidate signal-to-noise ratio as the target modulation and coding scheme.

It can be learned that based on the preset first mapping relationship and the preset second mapping relationship, the network side device can quickly determine a proper target modulation and coding scheme, thereby improving waveform selection efficiency and reducing operation load.

108. The network side device determines a target modulation scheme based on the target RANK and the target modulation and coding scheme.

The modulation scheme corresponding to the target modulation format may include binary phase shift keying (BPSK) and quadrature phase shift keying (QPSK), 16QAM, 64QAM, 256QAM, and the like.

In some embodiments of this application, a waveform selection rule may further be preset, to improve waveform selection efficiency. Table 3 is an example of the waveform selection rule.

TABLE 3

| Modulation | SelRank | |
|---|---|---|
| | =1 | >1 |
| Pi/2 BPSK | DFT-S-OFDM | CP-OFDM |
| QPSK | | |
| 16QAM | CP-OFDM | |
| 64QAM | | |
| 256QAM | | |

109. The network side device determines, based on the target modulation scheme and the target RANK, a waveform type currently selected for the terminal device.

The waveform type includes CP-OFDM or DFT-S-OFDM.

Compared with an existing mechanism, in this embodiment of this application, the network side device measures, based on the uplink signal, the N corresponding first signal-to-noise ratios when the terminal device sends the uplink signal by using the N RANKs; calculates the first modulation and coding efficiency corresponding to each first signal-to-noise ratio; calculates, based on the first modulation and coding efficiency corresponding to each first signal-to-noise ratio, the second modulation and coding efficiency corresponding to each RANK; selects the target modulation and coding efficiency from the second modulation and coding efficiencies corresponding to the N RANKs; determines the target modulation and coding scheme based on the target modulation and coding efficiency and the historical waveform that is selected by the terminal device; and determines the target modulation scheme based on the target RANK and the target modulation and coding scheme, and finally, determines, based on the target modulation scheme and the target RANK, the waveform type currently selected for the terminal device. It can be learned that the network side device can select a proper waveform for the terminal device by using the waveform type selection mechanism in this solution. Compared with a scenario in which CP-OFDM is fixedly used, this application can increase a signal-to-noise ratio of sending and receiving a signal on a terminal device side, thereby improving an uplink throughput of the terminal device and improving a spectrum utilization rate.

In addition, a proper waveform is selected for the terminal device based on uplink transmission of the terminal device, so that CP-OFDM and DFT-S-OFDM can be flexibly switched. If CP-OFDM is selected, discontinuous frequency domain resources may be used. In this way, resource utilization can be effectively improved. If DFT-S-OFDM is selected, a peak-to-average power ratio during signal transmission performed by the terminal device may be reduced. It can be learned that a proper waveform can be flexibly selected for each type of terminal device by using the waveform selection mechanism in this embodiment of this application, and a relatively high uplink throughput can be ensured.

For ease of understanding, the following uses a base station as an example for description. Details are as follows:

Step 1. The base station measures SINRs corresponding to different RANKs.

Step 2. The base station selects a target RANK.

A method for selecting a RANK by the base station include steps (1) to (3):

(1) Calculate a modulation and coding efficiency EFF[iRank][iLayer] corresponding to SINR[iRank][iLayer], where iRank=1, 2, . . . , or MaxRank; iLayer=0, 1, . . . , or iRank−1; and MaxRank indicates a maximum RANK that can be used by the terminal device.

A method for calculating the modulation and coding efficiency corresponding to the SINR is as follows:

a. If the historical waveform is CP-OFDM, SINR[SelRank] is compared with all $SINR_i$ in Table 1 one by one, where i=N−1, N−2, . . . , or 0, and SINR[SelRank] represents an SINR corresponding to a selected target RANK.

If SINR[SelRank]≥$SINR_i$, comparison is stopped, and $EFF_i$ corresponding to $SINR_i$ is selected as EFF[SelRank], where EFF[SelRank] represents EFF corresponding to the selected $SINR_i$.

b. If the historical waveform is DFT-S-OFDM, SINR[SelRank] is compared with all $SINR_i$ in Table 2 one by one, where i=N−1, N−2, . . . , or 0.

If SINR[SelRank]≥$SINR_i$, comparison is stopped, and $EFF_i$ corresponding to $SINR_i$ is selected as EFF[SelRank].

(2) Calculate, based on EFF[iRank][iLayer], a modulation and coding efficiency EFF[iRank] corresponding to each RANK. A calculation method is $$EFF[iRank] = \sum_{iLayer=0}^{SelRank-1} EFF[iRank][iLayer].$$

(3) Select a RANK based on modulation and coding efficiencies EFF[iRank] of different RANKs. The selection method is as follows:

selecting the largest EFF from EFF[1], EFF[2] . . . , and EFF[MaxRank]; and denoting a RANK value corresponding to the largest EFF as SelRank.

Step 3. The base station selects a target MCS.

An SINR corresponding to the target RANK value (SelRank) selected in step 2 is calculated, and the target MCS is selected based on the historical waveform. The historical waveform is a waveform previously selected by a system.

A specific process is as follows:

An SINR value (that is, SINR[SelRank]) corresponding to the selected RANK value (that is, SelRank) is calculated. In some implementations, calculation may be performed by using the following formula:

$$SINR[SelRank] = \frac{1}{SelRank} \sum_{iLayer=0}^{SelRank-1} SINR[SelRank][iLayer]$$

Figure 2:
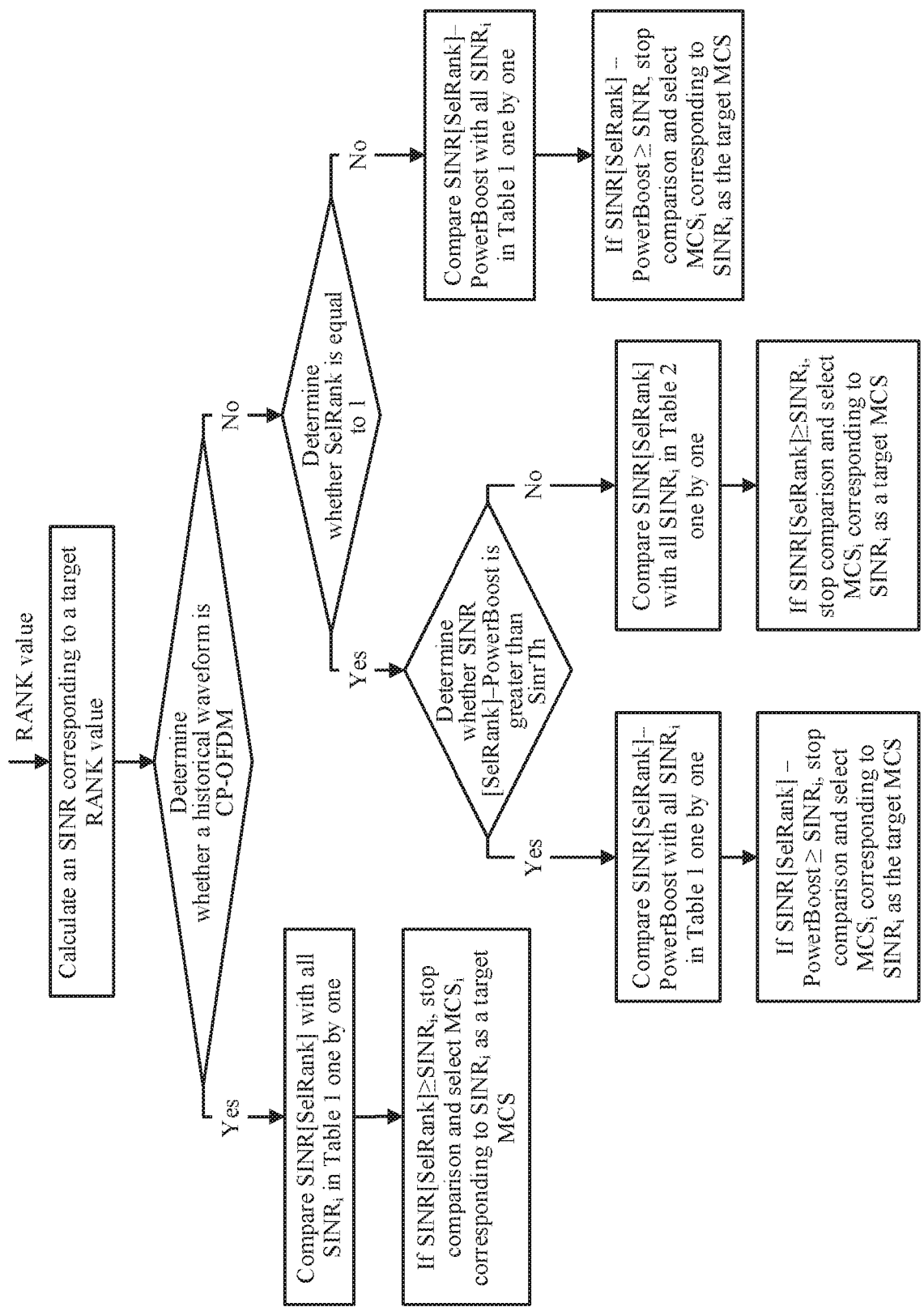
FIG. 2 is a flowchart of determining a target MCS according to an embodiment of this application.

The selected MCS is initialized to 0, and then whether the historical waveform is CP-OFDM is determined. For a specific flowchart of determining the target MCS, refer to FIG. 2.

(1) If the historical waveform is CP-OFDM.

the base station compares SINR[SelRank] with all SINRi in Table 1 one by one, where i=N−1, N−2, . . . , or 0.

If SINR[SelRank]≥$SINR_i$, comparison is stopped, and $MCS_i$ corresponding to $SINR_i$ is selected as the target MCS.

(2) If the historical waveform is not CP-OFDM,
whether SelRank is equal to 1 is determined:

a. If SelRank is equal to 1, whether SINR[SelRank]−PowerBoost is greater than SinrTh is determined.

PowerBoost is a power back-off gain, representing a power back-off (Power Back) gain of DFT-S-OFDM relative to CP-OFDM. SinrTh is a signal-to-noise ratio threshold, for example, may represent an SINR corresponding to an MCS whose modulation scheme is 16QAM and whose code rate is the lowest in Table 1.

If SINR[SelRank]−PowerBoost>SinrTh, SINR[SelRank]−PowerBoost is compared with all $SINR_i$ in Table 1 one by one, where i=N−1, N−2, . . . or 0, and SINRi represents a candidate signal-to-noise ratio. If SINR[SelRank]−PowerBoost>$SINR_i$, comparison is stopped, and $MCS_i$ corresponding to $SINR_i$ is selected as the target MCS.

If SINR[SelRank]−PowerBoost≤SinrTh, SINR[SelRank] is compared with all $SINR_i$ in Table 2 one by one, where i=N−1, N−2, . . . or 0, and $SINR_i$ represents a candidate signal-to-noise ratio. If SINR[SelRank]≥$SINR_i$, comparison is stopped, and $MCS_i$ corresponding to $SINR_i$ is selected as the target MCS.

b. If SelRank>1, SINR[SelRank]−PowerBoost is compared with all $SINR_i$ in Table 1 one by one, where i=N−1, N−2, . . . , or 0, and $SINR_i$ represents a candidate signal-to-noise ratio. If SINR[SelRank]−PowerBoost≥$SINR_i$, comparison is stopped, and $MCS_i$ corresponding to $SINR_i$ is selected as the target MCS.

Step 4. The base station selects a waveform for the terminal device.

The base station may determine, based on the mapping relationship shown in Table 3 and based on the RANK selected in step 2 and the modulation scheme corresponding to the target MCS selected in step 3, the waveform used by the terminal device.

Figure 3:
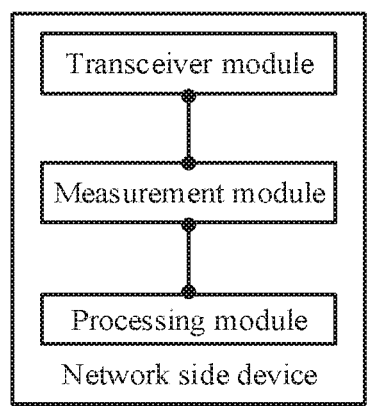
FIG. 3 is a schematic structural diagram of a network side device according to an embodiment of this application.

Referring to FIG. 3, the following describes a network side device configured to perform the waveform selection method in FIG. 1 in the embodiments of this application. The network side device has all functions of implementing the network side device in the foregoing method embodiment. The functions may be implemented by hardware, or may be implemented by hardware executing corresponding software. The hardware or the software includes one or more modules corresponding to the foregoing functions. The module may be software and/or hardware. The network side device includes:

a transceiver module, configured to obtain an uplink signal sent by a terminal device;

a measurement module, configured to measure, based on the uplink signal obtained by the transceiver module, N corresponding first signal-to-noise ratios when the terminal device sends the uplink signal by using N RANKs, where N is a positive integer; and a processing module, configured to: calculate a first modulation and coding efficiency corresponding to each first signal-to-noise ratio;

calculate, based on the first modulation and coding efficiency corresponding to each first signal-to-noise ratio, a second modulation and coding efficiency corresponding to each RANK;

select a target modulation and coding efficiency from second modulation and coding efficiencies corresponding to the N RANKs;

determine a target modulation and coding scheme based on the target modulation and coding efficiency and a historical waveform that is selected by the terminal device;

determine a target modulation scheme based on a target RANK and the target modulation and coding scheme; and determine, based on the target modulation scheme and the target RANK, a waveform type currently selected for the terminal device, where the waveform type includes cyclic prefix orthogonal frequency division multiplexing CP-OFDM or discrete Fourier transform spread orthogonal frequency division multiplexing DFT-S-OFDM.

In this embodiment of this application, the measurement module measures, based on the uplink signal, the N corresponding first signal-to-noise ratios when the terminal device sends the uplink signal by using the N RANKs; and the processing module calculates the first modulation and coding efficiency corresponding to each first signal-to-noise ratio; calculates, based on the first modulation and coding efficiency corresponding to each first signal-to-noise ratio, the second modulation and coding efficiency corresponding to each RANK; selects the target modulation and coding efficiency from the second modulation and coding efficiencies corresponding to the N RANKs; determines the target modulation and coding scheme based on the target modulation and coding efficiency and the historical waveform that is selected by the terminal device; and determines the target modulation scheme based on the target RANK and the target modulation and coding scheme. It can be learned that the network side device can select a proper waveform for the terminal device by using this solution. Compared with a scenario in which CP-OFDM is fixedly used, this application can increase a signal-to-noise ratio of sending and receiving a signal on a terminal device side, thereby improving an uplink throughput of the terminal device.

Optionally, in some embodiments of this application, the processing module is specifically configured to perform one of the following operations:

if the historical waveform is CP-OFDM, determining a target signal-to-noise ratio in the N first signal-to-noise ratios based on a first mapping relationship, and using a modulation and coding efficiency corresponding to the target signal-to-noise ratio as the first modulation and coding efficiency; or if the historical waveform is DFT-S-OFDM, determining a target signal-to-noise ratio in the N first signal-to-noise ratios based on a second mapping relationship, and using a modulation and coding efficiency corresponding to the target signal-to-noise ratio as the first modulation and coding efficiency.

Optionally, in some embodiments of this application, the first mapping relationship includes a mapping relationship between a modulation and coding scheme, a modulation scheme, a signal-to-noise ratio, and a modulation and coding efficiency; and the processing module is specifically configured to:

select a first candidate signal-to-noise ratio from the N first signal-to-noise ratios;

traverse signal-to-noise ratios in the first mapping relationship; and when a signal-to-noise ratio less than or equal to the first candidate signal-to-noise ratio is found through traverse, determine the signal-to-noise ratio less than or equal to the first candidate signal-to-noise ratio as the target signal-to-noise ratio.

Optionally, in some embodiments of this application, the second mapping relationship includes a mapping relationship between a modulation and coding scheme, a modulation scheme, a signal-to-noise ratio, and a modulation and coding efficiency; and the processing module is specifically configured to:

select a second candidate signal-to-noise ratio from the N first signal-to-noise ratios;

traverse signal-to-noise ratios in the second mapping relationship; and when a signal-to-noise ratio less than or equal to the second candidate signal-to-noise ratio is found through traverse, determine the signal-to-noise ratio less than or equal to the second candidate signal-to-noise ratio as the target signal-to-noise ratio.

Optionally, in some embodiments of this application, the processing module is specifically configured to:

determine a target RANK corresponding to the target modulation and coding efficiency;

calculate a second signal-to-noise ratio corresponding to the target RANK; and determine the target modulation and coding scheme based on the second signal-to-noise ratio and the historical waveform that is selected by the terminal device.

Optionally, in some embodiments of this application, if the historical waveform is CP-OFDM, the processing module is specifically configured to:

traverse the signal-to-noise ratios in the first mapping relationship; and when a signal-to-noise ratio less than or equal to the second signal-to-noise ratio is found through traverse, use a modulation and coding scheme corresponding to the signal-to-noise ratio less than or equal to the second signal-to-noise ratio as the target modulation and coding scheme.

Optionally, in some embodiments of this application, if the historical waveform is DFT-S-OFDM, the processing module is specifically configured to:

when the target RANK=1, and a difference between the second signal-to-noise ratio and a power back-off gain is greater than a signal-to-noise ratio threshold, traverse the signal-to-noise ratios in the first mapping relationship; and if a candidate signal-to-noise ratio less than or equal to the difference between the second signal-to-noise ratio and the power back-off gain is found through traverse, use a modulation and coding scheme corresponding to the candidate signal-to-noise ratio as the target modulation and coding scheme; or when the target RANK=1, and a difference between the second signal-to-noise ratio and a power back-off gain is less than or equal to a signal-to-noise ratio threshold, traverse the signal-to-noise ratios in the second mapping relationship; and if a candidate signal-to-noise ratio less than or equal to a difference between the first signal-to-noise ratio and the power back-off gain is found through traverse, use a modulation and coding scheme corresponding to the candidate signal-to-noise ratio as the target modulation and coding scheme; or when the target RANK>1, traverse the signal-to-noise ratios in the first mapping relationship; and if a candidate signal-to-noise ratio less than or equal to a difference between the second signal-to-noise ratio and a power back-off gain is found through traverse, use a modulation and coding scheme corresponding to the candidate signal-to-noise ratio as the target modulation and coding scheme.

The foregoing describes the network side device and the terminal device in the embodiments of this application from a perspective of a modular functional entity. The following describes the network side device in the embodiments of this application from a perspective of hardware processing. It should be noted that, in the embodiment shown in FIG. 3 of this application, an entity device corresponding to the transceiver module may be a transceiver, an entity device corresponding to the processing module may be a processor, and an entity device corresponding to the measurement module in the embodiment shown in FIG. 3 may be a signal processor. The apparatus shown in FIG. 3 may have a structure shown in FIG. 4. When the apparatus shown in FIG. 3 has the structure shown in FIG. 4, a processor and a transceiver in FIG. 4 can implement functions that are the same as or similar to those of the processing module and the transceiver module provided in the apparatus embodiment corresponding to the apparatus, and a central memory in FIG. 4 stores program code that needs to be invoked when the processor performs the waveform selection method.

Figure 4:
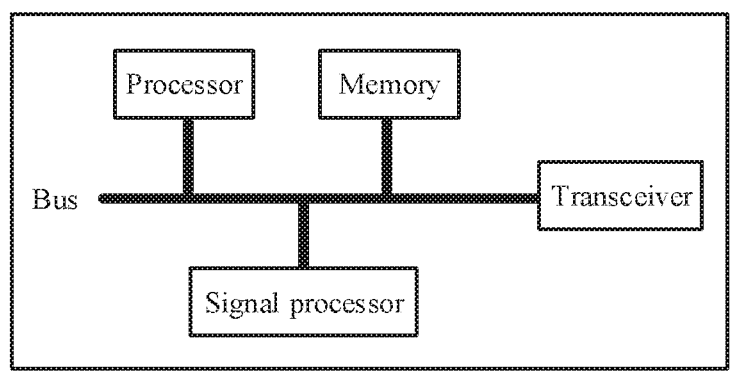
FIG. 4 is another schematic structural diagram of a network side device according to an embodiment of this application.

For example, when the apparatus shown in FIG. 4 is configured to implement a function of the network side device in the embodiments of this application, the processor may invoke the stored program code to perform the following operations:

obtaining, by using the transceiver, an uplink signal sent by a terminal device;

measuring, by using the measurement unit, N corresponding first signal-to-noise ratios when the terminal device sends the uplink signal by using N RANKs;

calculating a first modulation and coding efficiency corresponding to each first signal-to-noise ratio;

calculating, based on the first modulation and coding efficiency corresponding to each first signal-to-noise ratio, a second modulation and coding efficiency corresponding to each RANK;

selecting a target modulation and coding efficiency from second modulation and coding efficiencies corresponding to the N RANKs;

determining a target modulation and coding scheme based on the target modulation and coding efficiency and a historical waveform that is selected by the terminal device;

determining a target modulation scheme based on a target RANK and the target modulation and coding scheme; and determining, based on the target modulation scheme and the target RANK, a waveform type currently selected for the terminal device, where the waveform type includes cyclic prefix orthogonal frequency division multiplexing CP-OFDM or discrete Fourier transform spread orthogonal frequency division multiplexing DFT-S-OFDM.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, and or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

The technical solutions provided in this application are described in detail above. The principle and implementation of this application are described herein through specific examples. The description about the embodiments is merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:

1. A waveform selection method, comprising:
   obtaining an uplink signal sent by a terminal device;
   measuring, based on the uplink signal, N corresponding signal-to-noise ratios when the terminal device sends the uplink signal by using N ranks, wherein N is a positive integer;
   calculating a first modulation and coding efficiency corresponding to each of the N signal-to-noise ratios;
   calculating, based on the first modulation and coding efficiency corresponding to each of the N signal-to-noise ratios, a second modulation and coding efficiency corresponding to each of the N ranks;
   selecting a target modulation and coding efficiency from second modulation and coding efficiencies corresponding to the N ranks;
   determining a target modulation and coding scheme based on the target modulation and coding efficiency and a historical waveform selected by the terminal device;
   determining a target modulation scheme based on a target rank and the target modulation and coding scheme; and
   determining, based on the target modulation scheme and the target rank, a waveform type currently selected for the terminal device, wherein the waveform type comprises cyclic prefix orthogonal frequency division multiplexing (CP-OFDM) or discrete Fourier transform spread orthogonal frequency division multiplexing (DFT-S-OFDM).

2. The method according to claim 1, wherein the first modulation and coding efficiency is a modulation and coding efficiency corresponding to a target signal-to-noise ratio in the N signal-to-noise ratios, the target signal-to-noise ratio is determined based on a first mapping relationship if the historical waveform is CP-OFDM or the target signal-to-noise ratio is determined based on a second mapping relationship if the historical waveform is DFT-S-OFDM.

3. The method according to claim 2, wherein the first mapping relationship comprises one or more mapping relationships between one or more modulation and coding schemes, one or more modulation schemes, one or more signal-to-noise ratios, and one or more modulation and coding efficiencies; and the determining a target signal-to-noise ratio in the N signal-to-noise ratios based on a first mapping relationship comprises:
   selecting a first candidate signal-to-noise ratio from the N signal-to-noise ratios;
   traversing one or more signal-to-noise ratios in the first mapping relationship to identify a signal-to-noise ratio less than or equal to the first candidate signal-to-noise ratio; and
   in response to identifying the signal-to-noise ratio less than or equal to the first candidate signal-to-noise ratio, determining the signal-to-noise ratio less than or equal to the first candidate signal-to-noise ratio as the target signal-to-noise ratio.

4. The method according to claim 2, wherein the second mapping relationship comprises one or more mapping relationships between one or more modulation and coding schemes, one or more modulation schemes, one or more signal-to-noise ratios, and one or more modulation and coding efficiencies; and the determining a target signal-to-noise ratio in the N signal-to-noise ratios based on a second mapping relationship comprises:
   selecting a second candidate signal-to-noise ratio from the N signal-to-noise ratios;
   traversing the one or more signal-to-noise ratios in the second mapping relationship to identify a signal-to-noise ratio less than or equal to the second candidate signal-to-noise ratio; and
   in response to identifying the signal-to-noise ratio less than or equal to the second candidate signal-to-noise ratio, determining the signal-to-noise ratio less than or equal to the second candidate signal-to-noise ratio as the target signal-to-noise ratio.

5. The method according to claim 3, wherein the determining the target modulation and coding scheme comprises:

determining a target rank corresponding to the target modulation and coding efficiency;

calculating a signal-to-noise ratio corresponding to the target rank; and determining the target modulation and coding scheme based on the signal-to-noise ratio corresponding to the target rank and the historical waveform.

6. The method according to claim 5, wherein the historical waveform is CP-OFDM, the determining the target modulation and coding scheme based on the signal-to-noise ratio corresponding to the target rank and the historical waveform comprises:

identifying a signal-to-noise ratio less than or equal to the signal-to-noise ratio corresponding to the target rank based on traversing the one or more signal-to-noise ratios in the first mapping relationship as the target modulation and coding scheme.

7. The method according to claim 5, wherein the historical waveform is DFT-S-OFDM, the determining the target modulation and coding scheme based on the signal-to-noise ratio corresponding to the target rank and the historical waveform comprises:

when the target rank=1, and a difference between the signal-to-noise ratio corresponding to the target rank and a power back-off gain is greater than a signal-to-noise ratio threshold, identifying a candidate signal-to-noise ratio less than or equal to the difference between the signal-to-noise ratio corresponding to the target rank and the power back-off gain based on traversing the one or more signal-to-noise ratios in the first mapping relationship;

when the target rank=1, and a difference between the signal-to-noise ratio corresponding to the target rank and a power back-off gain is less than or equal to a signal-to-noise ratio threshold, identifying a candidate signal-to-noise ratio less than or equal to the difference between a signal-to-noise ratio of the N signal-to-noise ratios and the power back-off gain based on traversing the one or more signal-to-noise ratios in the second mapping relationship; or when the target rank>1, identifying a candidate signal-to-noise ratio less than or equal to a difference between the signal-to-noise ratio corresponding to the target rank and a power back-off gain based on traversing the one or more signal-to-noise ratios in the first mapping relationship.

8. A network side device, comprising:

at least one processor; and a non-transitory computer-readable storage medium coupled to the at least one processor and storing programming instructions for execution by the at least one processor, the programming instructions instruct the at least one processor to:

obtain an uplink signal sent by a terminal device;

measure, based on the uplink signal obtained by a transceiver, N corresponding signal-to-noise ratios when the terminal device sends the uplink signal by using N ranks, wherein N is a positive integer;

calculate a first modulation and coding efficiency corresponding to each of the N signal-to-noise ratios;

calculate, based on the first modulation and coding efficiency corresponding to each of the N signal-to-noise ratios, a second modulation and coding efficiency corresponding to each of the N ranks;

select a target modulation and coding efficiency from second modulation and coding efficiencies corresponding to the N ranks;

determine a target modulation and coding scheme based on the target modulation and coding efficiency and a historical waveform selected by the terminal device;

determine a target modulation scheme based on a target rank and the target modulation and coding scheme; and determine, based on the target modulation scheme and the target rank, a waveform type currently selected for the terminal device, wherein the waveform type comprises cyclic prefix orthogonal frequency division multiplexing (CP-OFDM) or discrete Fourier transform spread orthogonal frequency division multiplexing (DFT-S-OFDM).

9. The network side device according to claim 8, wherein the first modulation and coding a modulation and coding efficiency corresponding to a target signal-to-noise ratio in the N signal-to-noise ratios, the target signal-to-noise ratio is determined based on a first mapping relationship if the historical waveform is CP-OFDM or the target signal-to-noise ratio is determined based on a second mapping relationship if the historical waveform is DFT-S-OFDM.

10. The network side device according to claim 9, wherein the first mapping relationship comprises one or more mapping relationships between one or more modulation and coding schemes, one or more modulation schemes, one or more signal-to-noise ratios, and one or more modulation and coding efficiencies; and the programming instructions further instruct the at least one processor to:

select a first candidate signal-to-noise ratio from the N signal-to-noise ratios;

traverse one or more signal-to-noise ratios in the first mapping relationship to identify a signal-to-noise ratio less than or equal to the first candidate signal-to-noise ratio; and in response to identifying the signal-to-noise ratio less than or equal to the first candidate signal-to-noise ratio, determine the signal-to-noise ratio less than or equal to the first candidate signal-to-noise ratio as the target signal-to-noise ratio.

11. The network side device according to claim 9, wherein the second mapping relationship comprises one or more mapping relationships between one or more modulation and coding schemes, one or more modulation schemes, one or more signal-to-noise ratios, and one or more modulation and coding efficiencies; and the programming instructions instruct the processor to:

select a second candidate signal-to-noise ratio from the N signal-to-noise ratios;

traverse the one or more signal-to-noise ratios in the second mapping relationship to identify a signal-to-noise ratio less than or equal to the second candidate signal-to-noise ratio; and in response to identifying the signal-to-noise ratio less than or equal to the second candidate signal-to-noise ratio, determine the signal-to-noise ratio less than or equal to the second candidate signal-to-noise ratio as the target signal-to-noise ratio.

12. The network side device according to claim 10, wherein the programming instructions further instruct the at least one processor to:

determine a target rank corresponding to the target modulation and coding efficiency;

calculate a signal-to-noise ratio corresponding to the target rank; and determine the target modulation and coding scheme based on the signal-to-noise ratio corresponding to the target rank and the historical waveform.

13. The network side device according to claim 12, wherein the historical waveform is CP-OFDM, the programming instructions instruct the processor to:
  identify a signal-to-noise ratio less than or equal to the signal-to-noise ratio corresponding to the target rank based on traversing the one or more signal-to-noise ratios in the first mapping relationship as the target modulation and coding scheme.

14. The network side device according to claim 12, wherein the historical waveform is DFT-S-OFDM, the programming instructions instruct the processor to:
  when the target rank=1, and a difference between the signal-to-noise ratio corresponding to the target rank and a power back-off gain is greater than a signal-to-noise ratio threshold, identifying a candidate signal-to-noise ratio less than or equal to the difference between the signal-to-noise ratio corresponding to the target rank and the power back-off gain based on traversing the one or more signal-to-noise ratios in the first mapping relationship;
  when the target rank=1, and a difference between the signal-to-noise ratio corresponding to the target rank and a power back-off gain is less than or equal to a signal-to-noise ratio threshold, identifying a candidate signal-to-noise ratio less than or equal to the difference between a signal-to-noise ratio of the N signal-to-noise ratios and the power back-off gain based on traversing the one or more signal-to-noise ratios in the second mapping relationship; or
  when the target rank>1, identifying a candidate signal-to-noise ratio less than or equal to a difference between the signal-to-noise ratio corresponding to the target rank and a power back-off gain based on traversing the one or more signal-to-noise ratios in the first mapping relationship.

15. A non-transitory storage medium that stores one or more instructions, wherein when the one or more instructions are executed by a computer, the computer is enabled to perform operations comprising:
  obtaining an uplink signal sent by a terminal device;
  measuring, based on the uplink signal, N corresponding signal-to-noise ratios when the terminal device sends the uplink signal by using N ranks, wherein N is a positive integer;
  calculating a first modulation and coding efficiency corresponding to each of the N signal-to-noise ratios;
  calculating, based on the first modulation and coding efficiency corresponding to each of the N signal-to-noise ratios, a second modulation and coding efficiency corresponding to each of the N ranks;
  selecting a target modulation and coding efficiency from second modulation and coding efficiencies corresponding to the N ranks;
  determining a target modulation and coding scheme based on the target modulation and coding efficiency and a historical waveform selected by the terminal device;
  determining a target modulation scheme based on a target rank and the target modulation and coding scheme; and
  determining, based on the target modulation scheme and the target rank, a waveform type currently selected for the terminal device, wherein the waveform type comprises cyclic prefix orthogonal frequency division multiplexing (CP-OFDM) or discrete Fourier transform spread orthogonal frequency division multiplexing (DFT-S-OFDM).

16. The non-transitory storage medium according to claim 15, wherein the first modulation and coding efficiency is a modulation and coding efficiency corresponding to a target signal-to-noise ratio in the N signal-to-noise ratios, the target signal-to-noise ratio is determined based on a first mapping relationship if the historical waveform is CP-OFDM or the target signal-to-noise ratio is determined based on a second mapping relationship if the historical waveform is DFT-S-OFDM.

17. The non-transitory storage medium according to claim 16, wherein the first mapping relationship comprises one or more mapping relationships between one or more modulation and coding schemes, one or more modulation schemes, one or more signal-to-noise ratios, and one or more modulation and coding efficiencies; and
  the determining a target signal-to-noise ratio in the N signal-to-noise ratios based on a first mapping relationship comprises:
    selecting a first candidate signal-to-noise ratio from the N signal-to-noise ratios;
    traversing one or more signal-to-noise ratios in the first mapping relationship to identify a signal-to-noise ratio less than or equal to the first candidate signal-to-noise ratio; and
    in response to identifying the signal-to-noise ratio less than or equal to the first candidate signal-to-noise ratio, determining the signal-to-noise ratio less than or equal to the first candidate signal-to-noise ratio as the target signal-to-noise ratio.

18. The non-transitory storage medium according to claim 16, wherein the second mapping relationship comprises one or more mapping relationships between one or more modulation and coding schemes, one or more modulation schemes, one or more signal-to-noise ratios, and one or more modulation and coding efficiencies; and the determining a target signal-to-noise ratio in the N signal-to-noise ratios based on a second mapping relationship comprises:
  selecting a second candidate signal-to-noise ratio from the N signal-to-noise ratios;
  traversing the one or more signal-to-noise ratios in the second mapping relationship to identify a signal-to-noise ratio less than or equal to the second candidate signal-to-noise ratio; and
  in response to identifying the signal-to-noise ratio less than or equal to the second candidate signal-to-noise ratio, determining the signal-to-noise ratio less than or equal to the second candidate signal-to-noise ratio as the target signal-to-noise ratio.

19. The non-transitory storage medium according to claim 17, wherein the determining the target modulation and coding scheme comprises:
  determining a target rank corresponding to the target modulation and coding efficiency;
  calculating a signal-to-noise ratio corresponding to the target rank; and
  determining the target modulation and coding scheme based on the signal-to-noise ratio corresponding to the target rank and the historical waveform.

20. The non-transitory storage medium according to claim 19, wherein the historical waveform is CP-OFDM, the determining the target modulation and coding scheme based on the signal-to-noise ratio corresponding to the target rank and the historical waveform comprises:

identifying a signal-to-noise ratio less than or equal to the signal-to-noise ratio corresponding to the target rank based on traversing the one or more signal-to-noise ratios in the first mapping relationship as the target modulation and coding scheme.

* * * * *